United States Patent
Schultz

(10) Patent No.: US 7,347,781 B2
(45) Date of Patent: Mar. 25, 2008

(54) METHOD AND SYSTEM FOR REALITY GAMING ON WIRELESS DEVICES

(75) Inventor: Charles P. Schultz, North Miami Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 334 days.

(21) Appl. No.: 10/792,139

(22) Filed: Mar. 3, 2004

(65) Prior Publication Data

US 2005/0197189 A1 Sep. 8, 2005

(51) Int. Cl.
*A63F 9/24* (2006.01)

(52) U.S. Cl. .......................... 463/42; 463/23

(58) Field of Classification Search ............... 463/1–6, 463/39–46; 380/200, 251; 709/217–219; 455/412.1, 412.2
See application file for complete search history.

(56) References Cited

U.S. PATENT DOCUMENTS

| | | | | |
|---|---|---|---|---|
| 5,797,085 | A * | 8/1998 | Beuk et al. | 455/88 |
| 6,117,013 | A * | 9/2000 | Eiba | 463/41 |
| 6,301,471 | B1 * | 10/2001 | Dahm et al. | 455/405 |
| 6,354,946 | B1 * | 3/2002 | Finn | 463/40 |
| 6,383,075 | B1 * | 5/2002 | Jeong et al. | 463/39 |
| 6,470,180 | B1 * | 10/2002 | Kotzin et al. | 455/412.1 |
| 6,524,189 | B1 * | 2/2003 | Rautila | 463/40 |
| 6,573,824 | B1 * | 6/2003 | Lovegreen et al. | 340/7.1 |
| 6,740,190 | B2 | 5/2004 | Takase | |
| 6,755,743 | B1 * | 6/2004 | Yamashita et al. | 463/42 |
| 6,908,389 | B1 * | 6/2005 | Puskala | 463/40 |
| 6,928,278 | B2 * | 8/2005 | Shimomura | 455/411 |
| 2002/0091564 | A1 | 7/2002 | Geller | |
| 2002/0158917 | A1 | 10/2002 | Sinclair et al. | |
| 2004/0047461 | A1 * | 3/2004 | Weisman et al. | 379/202.01 |

OTHER PUBLICATIONS

Stuart, Keith, *The Guardian*, "Playing The Dating Game On Location", http://www.guardian.co.uk/print/0,3858,4269545-110837,00.html, Oct. 24, 2001.
Pocket PC Thoughts, Hey! You Sank My Battleship! http://www.pocketpcwire.com/brief.asp?5053, Posted Jul. 9, 2003.

* cited by examiner

*Primary Examiner*—Robert E Pezzuto

(57) ABSTRACT

A system, method and computer readable medium are provided for facilitating a multiplayer game over a wireless network. According to the method, a request to transfer information between two of the wireless devices is received during the multiplayer game (e.g., 804), with the information being at least one of text, audio, and image information. It is determined whether the requested transfer is permitted according to a set of predefined rules for the multiplayer game (808), and the information is transferred between the two wireless devices only if it is determined that the predefined rules permit the requested transfer (810). Also provided are a wireless device (e.g., 106) for use with a multiplayer game and a server (e.g., 102) for facilitating a multiplayer game over a wireless network.

22 Claims, 9 Drawing Sheets

METHOD AND SYSTEM FOR REALITY GAMING ON WIRELESS DEVICES

FIELD OF THE INVENTION

The present invention generally relates to the field of wireless communications, and more particularly relates to gaming for wireless devices.

BACKGROUND OF THE INVENTION

With the advent of pagers and mobile phones the wireless service industry has grown into a multi-billion dollar industry. The Cellular Telecommunications and Internet Association calculates that 120 million Americans own a mobile telephone—about half of the U.S. population. As the development and availability of mobile telephones progresses the benefits of mobile telephones are reaching more and more people. The inclusion of games on mobile telephones has also enjoyed increasing popularity. It is common for modern cellular phones and Personal Digital Assistant—based communication devices to include features that are used for social purposes, such as messaging and cameras. While there are many types of games available for these phones, they do not take full advantage of these social capabilities.

In addition, revenues from massively multiplayer games, online games played between large numbers of participants, have increased as they have gained popularity. Massively multiplayer games, however, require users to be located at desktop computers or other static locations because the games require use of a computer. This leads many massively multiplayer game users to become uncomfortable or restless after long periods of time. Users of these games desire more freedom to do other things and have access to other locations as they play massively multiplayer games.

Therefore a need exists to overcome the problems with the prior art as discussed above.

SUMMARY OF THE INVENTION

Briefly, in accordance with the present invention, disclosed is a system, method and computer readable medium for facilitating a multiplayer game over a wireless network. One embodiment of the present invention provides a method for facilitating a multiplayer game using a plurality of wireless devices that are connected via a wireless network. According to the method, a request to transfer information between two of the wireless devices is received during the multiplayer game, with the information being at least one of text, audio, and image information. It is determined whether the requested transfer is permitted according to a set of predefined rules for the multiplayer game, and the information is transferred between the two wireless devices only if it is determined that the predefined rules permit the requested transfer.

Another embodiment of the present invention provides a wireless device for use with a multiplayer game. The wireless device includes an input interface, a game framework component, and a communication interface. The input interface receives a request to transfer information to another wireless device during the multiplayer game, with the information being at least one of text, audio, and image information. The game framework component determines whether the requested transfer is permitted according to a set of predefined rules for the multiplayer game, and the communication interface transfers the information with the other wireless device via a wireless network only if it is determined that the predefined rules permit the requested transfer.

Yet another embodiment of the present invention provides a server for facilitating a multiplayer game over a wireless network. The server includes an input interface, a game framework component, and a communication interface. The input interface receives a request to transfer information between two wireless devices during the multiplayer game, with the information being at least one of text, audio, and image information. The game framework component determines whether the requested transfer is permitted according to a set of predefined rules for the multiplayer game, and the communication interface transfers the information between the two wireless devices via a wireless network only if it is determined that the predefined rules permit the requested transfer.

Embodiments of the present invention are advantageous because they facilitate a collaborative multiplayer game that may be played using wireless devices over a wireless network. The present invention allows multiplayer games to be played without the restraint of requiring users to be located at desktop computers, or the constraint that a user is required to be co-located with other players to allow communication over a device interconnection cable or through short range wireless communication (e.g., via an infrared or Bluetooth connection). This allows for greater freedom of game participants and game locations.

DETAILED DESCRIPTION

The present invention, according to one embodiment, overcomes problems with the prior art by providing a system and method for facilitating a multiplayer game over a wireless network.

The present invention provides a means for a user of a wireless device to create and/or participate in a reality game with other users of a wireless device. According to one embodiment, the game has a sponsor who establishes the rules and rewards of the game. The game further has at least two teams of one or more participants, one or more tasks for the teams to engage in, video, voice and/or messaging communication between the teams, a population of viewers, and a means for viewers to monitor game transmissions and communications, and to score and/or vote for teams and/or their members.

Wireless System

Figure 1:
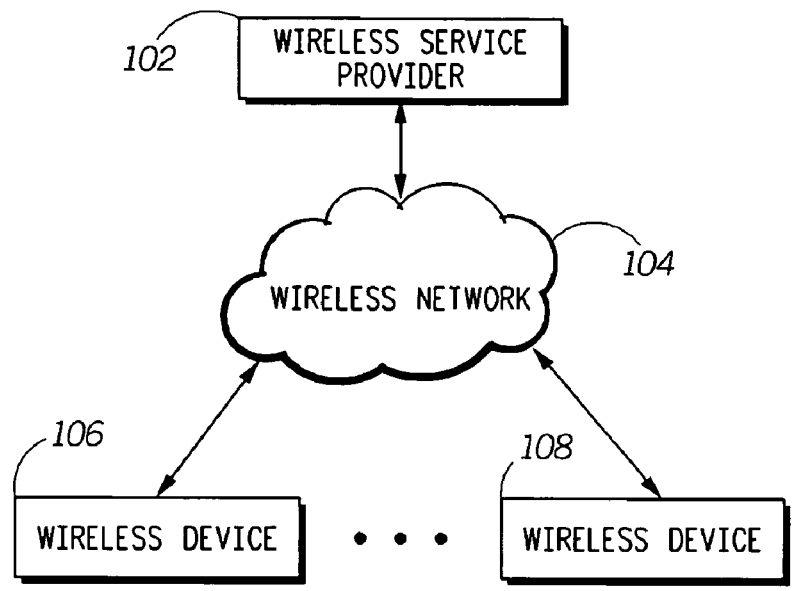
FIG. 1 is a block diagram illustrating a wireless communication system according to one embodiment of the present invention.

FIG. 1 is a block diagram illustrating a wireless communication system according to one embodiment of the present invention. The exemplary wireless communication system of FIG. 1 includes a wireless service provider 102, a wireless network 104 and wireless devices 106 through 108, also known as subscriber units. The wireless service provider 102 is a first-generation analog mobile phone service, a second-generation digital mobile phone service, a third-generation Internet-capable mobile phone service, text messaging service, a network access service, or the like. The exemplary wireless network 104 is a mobile phone network, a mobile radio network, a text messaging network, a pager network, a Local Area Network (LAN), a Wide Area Network (WAN), a Public Switched Telephone Network (PSTN), or the like. In this embodiment, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like.

Each wireless device 106 through 108 is a mobile phone, push-to-talk mobile radio, text messaging device, two way pager, personal digital assistant (PDA), handheld computer, palmtop computer, or any other wireless communications enabled device. Each wireless device 106 through 108 is equipped with a transmitter and receiver for communicating with the wireless-service provider 102 or with each other according to the appropriate wireless communication standard. The wireless network 104 supports any number of wireless devices.

Figure 2:
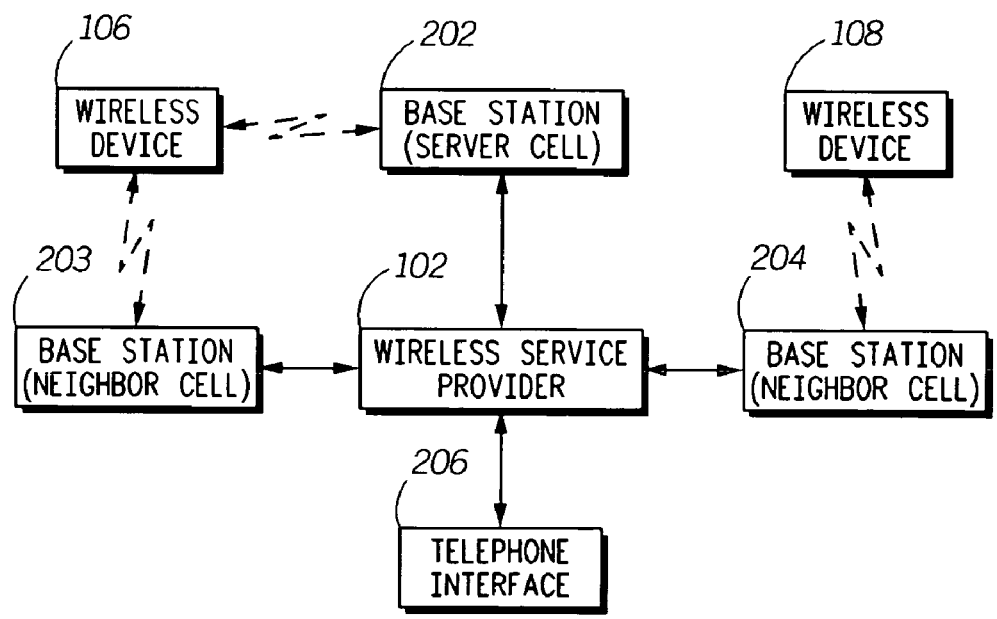
FIG. 2 is a more detailed block diagram of the wireless communication system of FIG. 1.

FIG. 2 is a more detailed block diagram of the conventional wireless communication system of FIG. 1. The wireless communication system of FIG. 2 includes the wireless service provider 102 coupled to base stations 202, 203, and 204, which represent the wireless network 104 of FIG. 1. The base stations 202, 203, and 204 individually support portions of a geographic coverage area containing subscriber units or transceivers (i.e., wireless devices) 106 and 108 (see FIG. 1). The wireless devices 106 and 108 interface with the base stations 202, 203, and 204 using a communication protocol, such as CDMA, FDMA, CDMA, GPRS or GSM. The wireless service provider 102 is interfaced to an external network, such as the Public Switched Telephone Network through a telephone interface 206.

The geographic coverage area of the wireless communication system of FIG. 2 is divided into regions or cells, which are individually serviced by the base stations 202, 203, and 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Generally, a wireless device selects a cell server that provides the best communication interface into the wireless communication system.

Ordinarily, this will depend on the signal quality of communication signals between a wireless device and a particular cell server. As a wireless device moves between various geographic locations in the coverage area, a hand-off or hand-over may be necessary to another cell server, which will then function as the primary cell server. For example, as wireless device 106 moves closer to base station 203, base station 202 hands off wireless device 106 to base station 203. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

Figure 3:
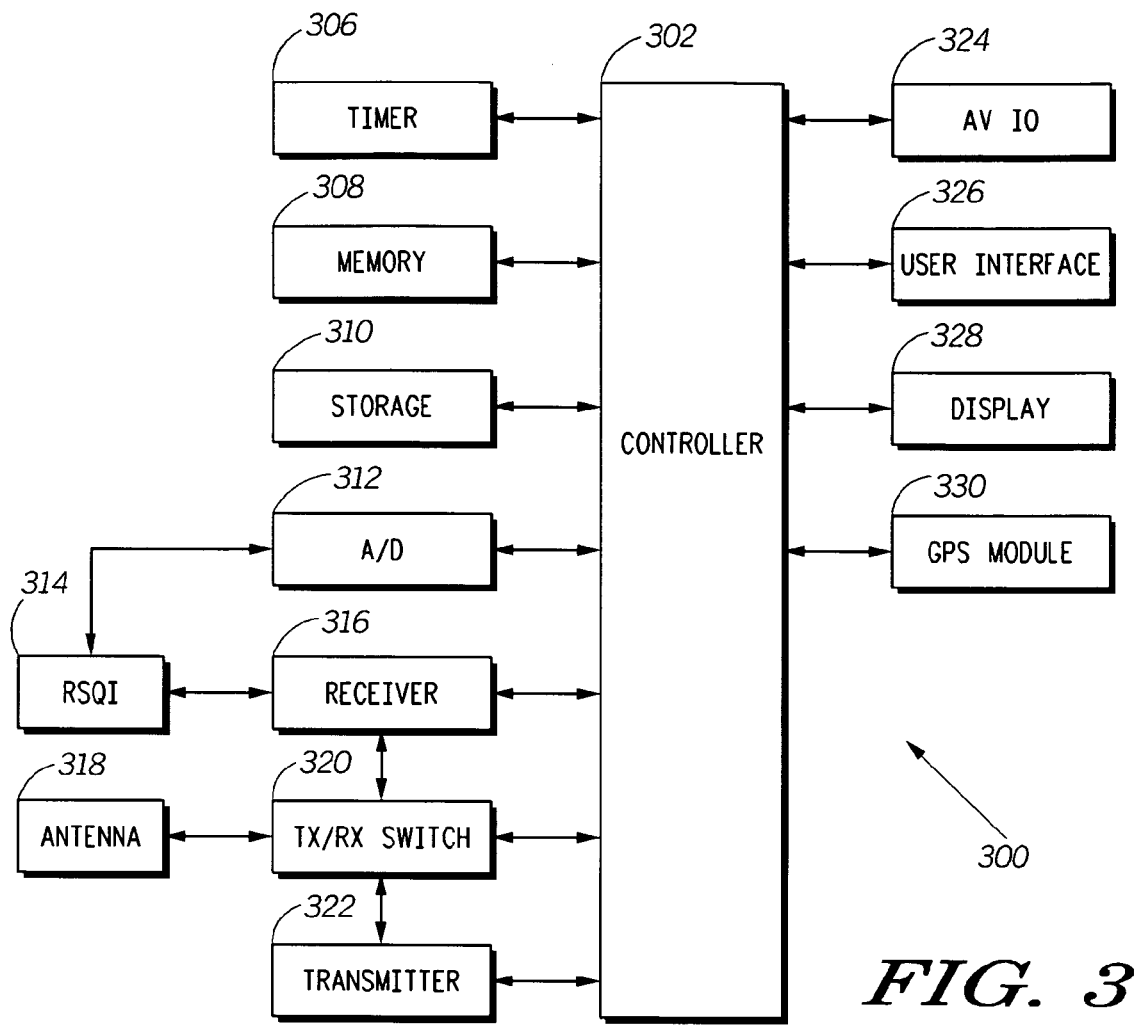
FIG. 3 is a block diagram illustrating a wireless device according to one embodiment of the present invention.

FIG. 3 is a block diagram illustrating a wireless device 300 according to one embodiment of the present invention. FIG. 3 shows a mobile telephone wireless device 300. In one embodiment of the present invention, the wireless device 300 is a two-way radio capable of receiving and transmitting radio frequency signals over a communication channel under a communications protocol such as CDMA, FDMA, TDMA, GPRS, GSM or the like.

The wireless device 300 operates under the control of a controller 302, or processor, which performs various functions such as the functions attributed to the multiplayer game, as described below. In various embodiments of the present invention, the processor 302 in FIG. 3 comprises a single processor or more than one processor for performing the tasks described below. FIG. 3 also includes a storage module 310 for storing information that may be used during the overall processes of the present invention. The controller 302 further switches the wireless device 300 between receive and transmit modes. In receive mode, the controller 302 couples an antenna 318 through a transmit/receive switch 320 to a receiver 316. The receiver 316 decodes the received signals and provides those decoded signals to the controller 302. In transmit mode, the controller 302 couples the antenna 318, through the switch 320, to a transmitter 322.

The controller 302 operates the transmitter 322 and receiver 316 according to instructions stored in memory 308. These instructions include a neighbor cell measurement-scheduling algorithm. In this embodiment of the present invention, memory 308 comprises any one or any combination of non-volatile memory, Flash memory or Random Access Memory. A timer module 306 provides timing information to the controller 302 to keep track of timed events. Further, the controller 302 utilizes the time information from the timer module 306 to keep track of scheduling for neighbor cell server transmissions and transmitted color code information.

When a neighbor cell measurement is scheduled, the receiver 316, under the control of the controller 302, monitors neighbor cell servers and receives a "received signal quality indicator" (RSQI). An RSQI circuit 314 generates RSQI signals representing the signal quality of the signals transmitted by each monitored cell server. Each RSQI signal is converted to digital information by an analog-to-digital converter 312 and provided as input to the controller 302. Using the color code information and the associated received signal quality indicator, the wireless device 300 determines the most appropriate neighbor cell server to use as a primary cell server when hand-off is necessary.

In one embodiment, the wireless device 300 is a wireless telephone. For this embodiment, the wireless device 300 of FIG. 3 further includes an audio/video input/output module 324 for allowing the input and output of audio and/or images (e.g., still images or video) via the wireless device 300. This includes a microphone for input of audio and a camera for input of still images and/or moving video. This also includes a speaker for output of audio and a display for output of still images and/or moving video. Also included is a user interface 326 for allowing the user to interact with the wireless device 300, such as by modifying address book information, interacting with call data information, making/answering calls and interacting with the game. The interface 326 includes a keypad, a touch pad, a touch sensitive display or other means for input of information. Wireless device 300 further includes a display 328 for displaying information to the user of the mobile telephone.

FIG. 3 also shows an optional Global Positioning System (GPS) module 330 for determining location and/or velocity information of the wireless device 300. This module 330 uses the GPS satellite system to determine the location and/or velocity of the wireless device 300. Alternative to the GPS module 330, the wireless device 300 may include alternative modules for determining the location and/or velocity of wireless device 300, such as modules that use cell tower triangulation and assisted GPS.

Managing a Game

The present invention provides a means for a wireless device user to create and/or participate in a multiplayer game, such as a multiplayer reality game, with other wireless device users. According to one embodiment, the game has a sponsor who establishes the rules and rewards of the game and at least two teams of one or more participants. The game can further have: one or more tasks for the teams to engage in, video, voice and/or messaging communication between the teams, a population of viewers, a means for viewers to monitor game transmissions and communications, and a means to score and/or vote for teams and/or their members.

As an example, a sponsor can be either the wireless service provider 102 or an individual wireless device 106 through 108. A sponsor posts or hosts a description of the game and an application form for wireless device users who wish to become participants, which can be accessed through the wireless network 104. Wireless device users who have previously indicated interest in such games have this preference stored by the wireless network 104 or their wireless device 106, depending on who sponsored the game previously. Wireless device users are notified by messaging or other means whenever new game information becomes available. The sponsor receives the application forms from prospective participants, selects participants, arranges them into teams, and the sponsor notifies applicants of their status—either as participants or viewers. The sponsor also advises participants and viewers of the date(s) and time(s) of the game, and issues IDs and passwords used to access and restrict the game functions, according to level of participation. The sponsor's date book or calendar can also be updated according to the game's schedule.

At the beginning of the game, the sponsor's wireless device or the wireless service provider 102 authenticates game participants according to their login information. During the game, a participant may select which camera view to watch, possibly including a split-screen mode to view two images or video simultaneously. The participant may also view voting results, receive answers from team members, view participant chats, view participant messages, post or send additional tasks, and provide feedback to teams or answer their questions. According to game conditions, the sponsor may also have control of team member camera activation. The sponsor also controls status changes of participants who are eliminated, which could result in making them viewers, and turning viewers into participants, such as when re-instating previously eliminated participants.

Upon receiving acknowledgement of their participation, a participant's date book or calendar is updated according to the game's schedule. At the start of the game, and/or each of the games events, participants login to the game using the previously assigned and received ID and password. Participants on a team can send and receive messages that cannot be viewed by members of other teams. Participant phones also have a video, still image and text log capability to record personal information during the game, as well as the ability to transmit location coordinates. Participants can also receive and respond to game questions, and are able to view their individual and/or team scoring, along with that of the other participants.

Upon receiving acknowledgement of their participation, a viewer's date book is updated according to the game's schedule. At the start of the game and/or each of the games events, viewers can log into the game using the previously assigned and received ID and password. During the game, viewers can message one another, chat with other viewers, view previously stored game video clips, and select which camera to view, possibly including a "rotating" view which cycles through a defined list of cameras. Viewers can also submit scores and/or vote during the course of the game.

At least one person associated with each team can use his wireless device to continuously or periodically capture audio, video, or still images of team activities. This multimedia information is compressed and periodically transmitted to the host site where it is stored and made available for viewers to review on their own wireless devices. Participants do not have access to other participants' multimedia information, except for teammates, nor to the sponsor's multimedia information.

Scoring criteria is made available to viewers and participants. Viewers and/or the sponsor send/post their scores during a timed scoring "window." After each scoring window, the scores are totaled and made available. Voting criteria can be made available to viewers and participants. Viewers, participants, and/or the sponsor send/post their votes during a timed voting "window." After each voting window, the scores can be totaled and made available.

During viewing, participating, or sponsoring of a game, normal mobile telephone functions may need to be accessed. These functions minimally interfere or interrupt the reality game functions. For example, messaging unrelated to the game is distinguishable from game messages by alert tone, color, light pattern, inbox, and/or icon, and initiation of an Emergency call will take precedence over any game functions, and use the full capabilities of the phone.

An example of a multiplayer reality game is a dating game that matches two people for a physical or virtual date. The date can consist of one or more activities that the daters participate in—for example, a recreational activity, followed by a meal, followed by a carriage ride. Other people, such as friends, or volunteer dating advisors can also participate on the team of each dater. For the virtual date, the daters view each other through the images transmitted by their wireless device's camera, and communicate verbally through voice calling. Viewers can see either dater by selecting which view to receive video from. During the date, the daters' team members can message them with comments, advice or information. These messages can also be viewed by the game viewers. At the end of each dating activity, viewers can use messaging to provide comments in a chat log, and may have the opportunity to provide a score for each dater. After all of the dating activities have been completed, a prize can be awarded to the dater (or dating team) with the highest score, or to both daters if they reach a certain point total.

Another example of a multiplayer reality game is an action game having two teams to perform tasks and earn points. The team with the most points for all of the tasks is the winner. There can also be a means for eliminating players from each team, based on low individual performance (scoring) or by low popularity among the viewers (voting). Teams may message each other during the competition. Viewers can access (subscribe to) any of the teams' messages, but teams may not view other teams' messages. When a member is eliminated from a team, they may continue to participate as a viewer. After all of the tasks have been completed and final scoring and/or voting has been tallied, a prize can be awarded to the team or participant/team with the highest score, or to the last remaining team or participant.

Game Management Architecture

Figure 4:
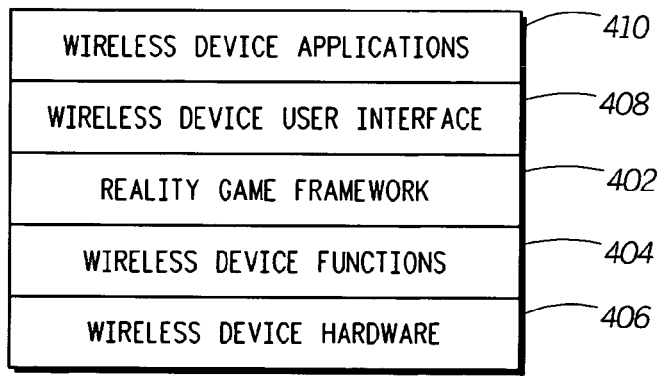
FIG. 4 is a block diagram illustrating the components of a wireless device used for gaming according to one embodiment of the present invention.

FIG. 4 is a block diagram illustrating the components of a wireless device 300 used for a multiplayer reality game according to one embodiment of the present invention. FIG. 4 shows the components of the wireless device 300 in the instance where the wireless device 300 is the sponsor of the multiplayer reality game.

A reality game framework component 402 regulates the main game functions, such as promulgating the rules of the game. Each game is associated with a set of rules that defines the nature of the contact and the information that flows between participants, viewers and the sponsor. The set of rules also regulates the manner in which the game progresses and determines the outcome of the game (e.g., the framework collects information about what happens during the game and processes this information according to the rules to determine the winner or winning team).

In addition to promulgating the rules of the game, the reality game framework component 402 passes game information (audio, video, still images, messages, etc.) between participants, viewers and the sponsor. The reality game framework component 402 also governs the use of and access to the functions 404 of the wireless device 300. This includes access to those wireless device functions that capture, transmit and receive audio, video and still images, as well as the push-to-talk functions and the voice functions of the wireless device 300. In turn, the functions 404 of the wireless device 300 regulate use of the wireless device hardware 406, such as audio/visual I/O component 324 of the wireless device 300. The hardware 406 also includes storage for storing predefined game parameters, such as some or all of the rules of one or more games. This allows the stored rules (and other game parameters) to be recalled and reused for setting up subsequent games without the need for them to be reentered.

The reality game framework component 402 further presents game information (audio, video, still images, messages, etc.) to the user of the wireless device 300 via an interface 408 of the wireless device 300, such as the user interface 326 or the display 328 of the wireless device 300. The user of the wireless device 300 can gain access to applications 410 of the wireless device 300, such as making calls and text messaging, via an interface 408 of the wireless device 300.

Figure 5:
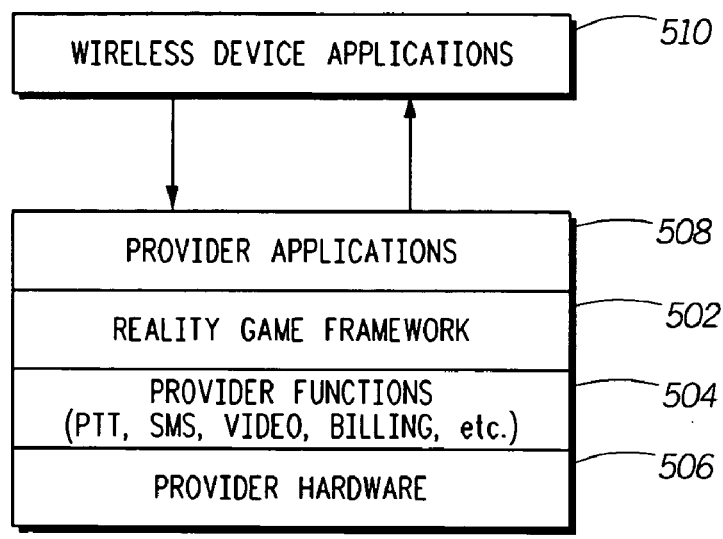
FIG. 5 is a block diagram illustrating the components of a wireless service provider used for gaming according to one embodiment of the present invention.

FIG. 5 is a block diagram illustrating the components of a wireless service provider 102 used for a multiplayer reality game according to one embodiment of the present invention. FIG. 5 shows the components of a server of the wireless service provider 102 in the instance where the server of the wireless service provider 102 is the sponsor of the multiplayer reality game.

A reality game framework component 502 regulates the main game functions, such as promulgating the rules of the game. In addition to promulgating the rules of the game, the reality game framework component 502 passes game information between participants, viewers and the sponsor. The reality game framework component 502 also determines the outcome (e.g., winner or winners) of the game, and based on the rules and results computed during the course of the game based on information collected relating to the progress of the game, may change the status of participants, viewers and/or teams. For example, in various embodiments the reality game framework component can do one or more of the following: change team membership, form new teams, remove one or more teams, and change the status of one or more users between participant and viewer, with such status changes altering the rules that apply to the affected users.

The reality game framework component 502 also governs the use of and access to the functions 504 of the server of the wireless service provider 102 that is sponsoring the game. This includes access to those functions that exchange audio, video and still images between participants, viewers and the sponsor, as well as regulation of the push-to-talk functions and the voice functions of the wireless devices participating in the game. In turn, the functions 504 regulate use of the hardware 506 that performs these functions on the server of the wireless service provider 102 that is sponsoring the game. The hardware 506 also includes storage for storing predefined game parameters, such as some or all of the rules of one or more games. This allows the stored rules (and other game parameters) to be recalled and reused for setting up subsequent games without the need for them to be reentered.

The reality game framework component 502 further interfaces with applications 508 of the server of the wireless service provider 102 that is sponsoring the game. This includes applications 508 that regulate wireless network 104 functions such as making calls and text messaging. The applications 508 of the server of the wireless service provider 102 regulate the applications 510 (such as the wireless device applications 410 of FIG. 4) of the wireless devices participating in the game.

Game Setup Process

Figure 6:
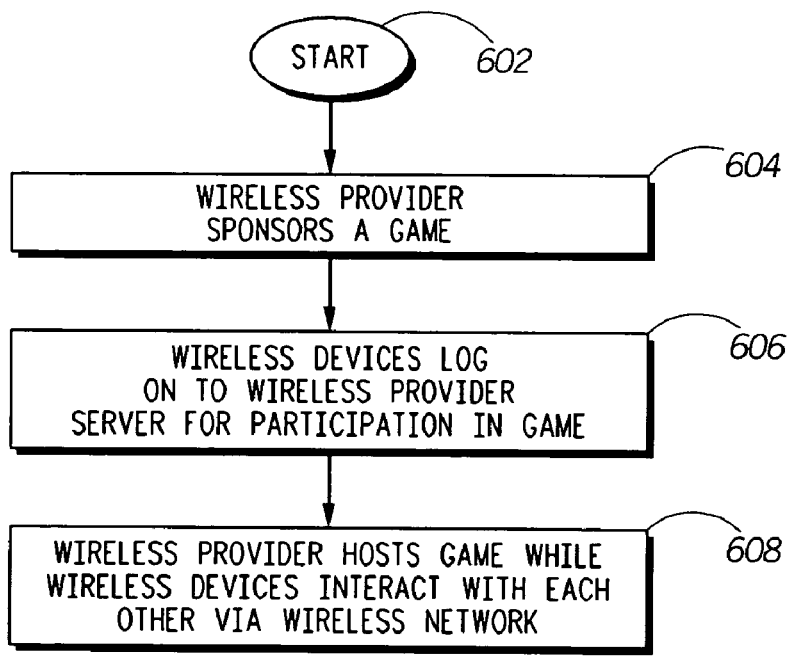
FIG. 6 is an operational flow diagram for a game setup process in which a wireless service provider sponsors the game according to one embodiment of the present invention.

FIG. 6 is an operational flow diagram for a game setup process in which a wireless service provider 102 sponsors the game according to one embodiment of the present invention. The operational flow diagram of FIG. 6 depicts the process of setting up a multiplayer reality game on a wireless network 104 that is sponsored by a server of the wireless service provider 102. The operational flow diagram of FIG. 6 begins with step 602 and flows directly to step 604.

In step 604, the wireless service provider 102 decides to sponsor a multiplayer reality game. This step can occur as a result of human interaction, such as an administrator making the decision, or automatically as a result of a predefined schedule. As the sponsor, the wireless service provider 102 defines the game parameters including the rules of the game, which define the nature of the contact and the information that flows between participants, viewers and the sponsor. These rules will be used by the reality game framework component during play to regulate the manner in which the game progresses and to determine the outcome of the game, as explained above. Some or all of the rules (and other game parameters) can be recalled from storage. After the game parameters have been defined, the server of the wireless service provider 102 notifies all or some subset of the wireless devices 106 through 108 that pertain to the wireless network 104 of the game, such as via voice mail, text messaging, or the like. In one embodiment, an invitation to the game, including a login name and password, is used as a notification to prospective game participants.

In step 606, multiple users of the wireless devices 106 through 108 decide to participate in the game and log into the server of the wireless service provider 102 that is sponsoring the game. In one embodiment, each user utilizes the login name and password included in the notification. In step 608, the server of the wireless service provider 102 sponsors the game while the participating wireless devices interact with each other via the wireless network 104 under the control of the reality game framework component that operates in accordance with the predefined rules of the game, as described above. Thus, in this embodiment, the server of the wireless service provider 102 that sponsors the game regulates game play and other aspects of the game.

Figure 7:
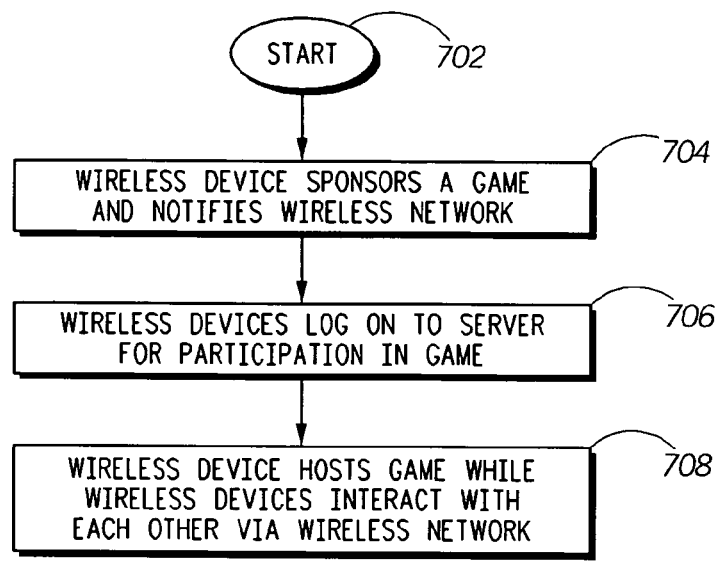
FIG. 7 is an operational flow diagram for a game setup process in which a wireless device sponsors the game according to one embodiment of the present invention.

FIG. 7 is an operational flow diagram for a game setup process in which a wireless device 300 sponsors the game according to one embodiment of the present invention. The operational flow diagram of FIG. 7 depicts the process of setting up a multiplayer reality game on a wireless network 104 that is sponsored by a wireless device 300. The operational flow diagram of FIG. 7 begins with step 702 and flows directly to step 704.

In step 704, a wireless device on the wireless network 104, such as wireless device 106, decides to sponsor a multiplayer reality game. This step can occur as a result of human interaction, such as a wireless device user making the decision, or automatically as a result of a predefined schedule. As the sponsor, the wireless device defines the game parameters including the rules of the game, which define the nature of the contact and the information that flows between participants, viewers and the sponsor. These rules will be used by the reality game framework component during play to regulate the manner in which the game progresses and to determine the outcome of the game, as explained above. Some or all of the rules (and other game parameters) can be recalled from the storage of the wireless device or the storage of the service provider. After the game parameters have been defined, all or some subset of the other wireless devices that pertain to the wireless network 104 are notified of the game, such as via voice mail, text messaging, or the like. In one embodiment, an invitation to the game, including a login name and password, is used as a notification to prospective game participants.

In step 706, one or more other users of the wireless devices of the wireless network 104 decide to participate in the game and log into the server that is sponsoring the game. In one embodiment, the other users utilize the login name and password included in the received notification. In step 708, the wireless device 106 sponsors the game while the participating wireless devices interact with each other via the wireless network 104 under the control of the reality game framework component that operates in accordance with the predefined rules of the game, as described above. Thus, in this embodiment, the wireless device 106 that sponsors the game regulates game play and other aspects of the game.

Game Parameters For An Exemplary Game

The following is a partial outline of rules and other game parameters that is used by the reality game framework to determine the device interaction, progress and outcome of one exemplary game. Such rules and other parameters can be selected via a graphical user interface, or specified in a textual description using an appropriate syntax that captures the selected values for each rule. Once defined, such rules and other parameters can be stored and retrieved for subsequent reuse, or edited to create a different game. This set of rules and other parameters is only meant for purposes of illustration, and any other rules and parameters can be defined and used to create any type of game within the game framework of the present invention.

Sponsorship/Game Info
    Sponsor Name: text or graphic
    Description of Game: text or URL
    Game Posting Dates
        Posting Date: mm-dd-yy
        Posting Time: hh:mm
        Duration: dd:hh:mm
        Automatically create two entries in Sponsor's Datebook
            Date and Time of initial posting
            Date and Time of completion (initial + duration)
    Game Dates
        Game Date: mm-dd-yy
        Game Time: hh:mm
        Game Duration: dd:hh:mm
        Automatically create two entries in Sponsor's Datebook
            Date and Time of start of game
            Date and Time of completion (initial + duration)
    Minimum Number of Participants Required: 1 – n
    Maximum Number of Participants Allowed: 1 – n
    Number of Participant Teams: 0 – n
    Maximum Number of Viewers: 0 – n
    Number of Viewer Teams: 0 – n
    Viewer Teams Linked to Participant Teams: Yes/No
    Application Form URL: URL
Participant Selection/Role
    Participant ID Required: Yes/No
        If Yes, then
            Participant ID: assigned unique to each Participant
            Participant Password: assigned unique to each Participant
    Participant Team: assigned only if Number of Teams >0
    Participants Share Messages: Yes/No/Team Only
    Participants Share Calls: Yes/No/Team Only
    Participants Share Video: Yes/No/Team Only
    Participants Share Text Log: Yes/No/Team Only
    Participants Share Location: Yes/No/Team Only
    Participant Elimination: Yes/No/To Viewers
    Participant Votes: Yes/No
        If Yes, then Participant Votes Visible to (one or more of):
            Sponsor/Viewers/Participants/Team/Other Teams
    Participant Scores: Yes/No/Team Only
        If Yes, then Participant Scores Visible to (one or more of):
            Sponsor/Viewers/Participants/Team/Other Teams
    Viewer Role
        Viewer ID Required: Yes/No
            If Yes, then
                Viewer ID: assigned unique to each Viewer
                Viewer Password: assigned unique to each Viewer
        Viewer Team: assigned only if Number of Viewer Teams >0
        Viewers See Participant Messages: Yes/No/Team Only -continued

```
      Viewers Share Calls: Yes/No/Team Only
      Viewers See Participant Video: Yes/No/Team Only
      Viewers See Participant Text Log: Yes/No/Team Only
      Viewers See Participant Location: Yes/No/Team Only
      Viewer Promotion to Participant: Yes/No
      Viewer Votes: Yes/No
         If Yes, then Viewer Votes Visible to (one or more of):
            Sponsor/Viewers/Participants/Team/Other Teams
      Viewer Scores: Yes/No/Team Only
         If Yes, then Viewers Scores Visible to (one or more of):
            Sponsor/Viewers/Participants/Team/Other Teams
   Sponsor Role
      . . .
```

Information Exchange During Gameplay

Figure 8:
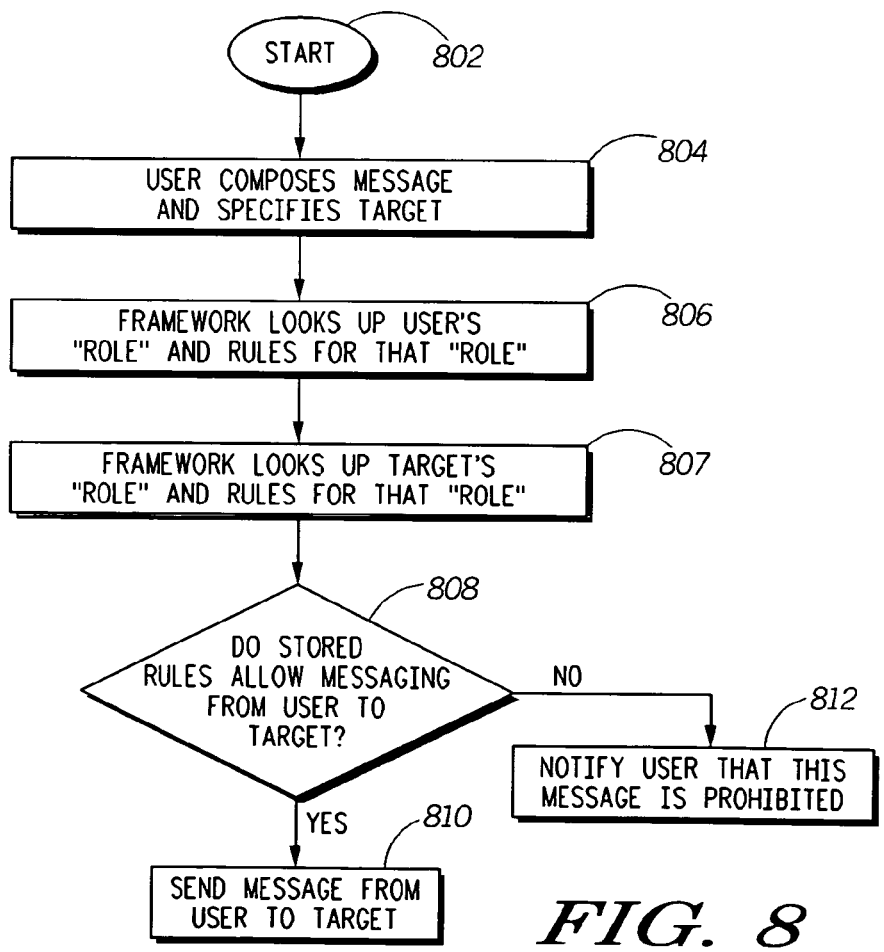
FIG. 8 is an operational flow diagram of message targeting logic on a wireless device according to an embodiment of the present invention.

FIG. 8 is an operational flow diagram of message targeting logic on a wireless device according to an embodiment of the present invention. The operational flow diagram of FIG. 8 depicts the process for handling messages composed by participants and viewers during a multiplayer reality game on a wireless network 104. The operational flow diagram of FIG. 8 begins with step 802 and flows directly to step 804.

In step 804, a user of a wireless device on the wireless network 104, such as wireless device 106, composes a message, such as a text message, and specifies a target of the message. The user is a participant or viewer, and the target of the message can be a viewer, a participant or the game sponsor (e.g., another wireless device or the wireless service provider 102). In step 806, the reality game framework component 402 of the wireless device 300 looks up the role of the sender of the message and the rules associated with the sender. Each game is associated with a set of rules that defines the nature of the contact and the information that is allowed to flow between participants, viewers and the sponsor. The set of rules also regulates the manner in which the game progresses and determines the outcome of the game.

In step 807, the reality game framework component 402 of the wireless device 300 looks up the role of the target of the message and the rules associated with the target. In step 808, the reality game framework component 402 of the wireless device 300 determines whether the message composed by the sender can be sent to the target according to the rules. For example, some rules may restrict communications with the sponsor, some rules may restrict communications by participants, some rules may restrict communications by non-participants (e.g., viewers), some rules may restrict communications between participants and non-participants, and some rules may restrict communications between participants that are on different teams (e.g., only allow certain communications between participants that are on the same team).

Figure 9:
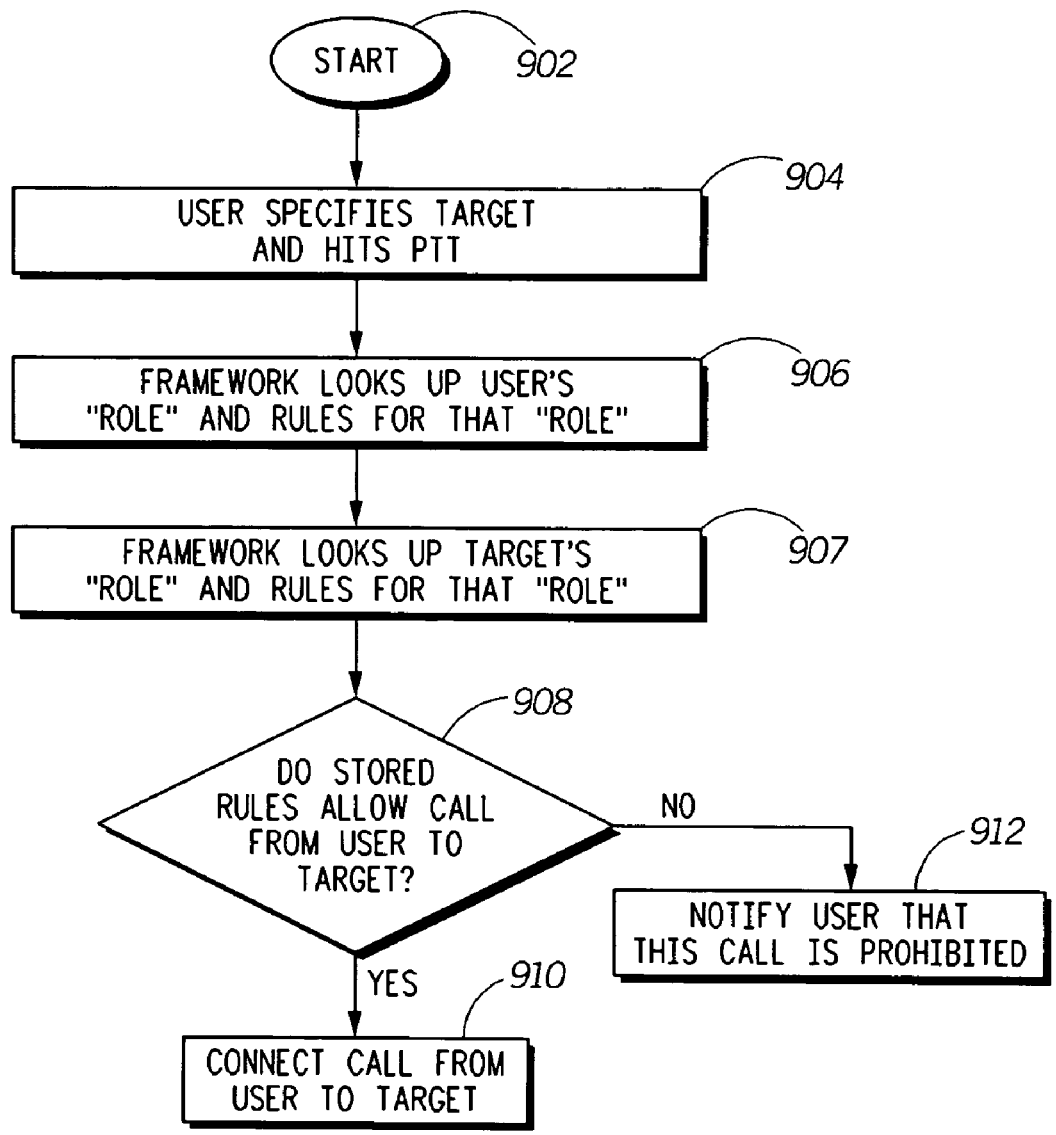
FIG. 9 is an operational flow diagram of voice targeting logic on a wireless device according to an embodiment of the present invention.

If the reality game framework component 402 of the wireless device 300 determines that the message composed by the sender can be sent to the target according to the rules, then in step 810 the wireless device 300 sends the message to the target. If the reality game framework component 402 of the wireless device 300 determines that the message composed by the sender cannot be sent to the target according to the rules, then in step 812 the wireless device 300 notifies the user that the message is prohibited from being sent to the target. FIG. 9 is an operational flow diagram of voice targeting logic on a wireless device according to an embodiment of the present invention. The operational flow diagram of FIG. 9 depicts the process for handling a voice call by a participant or viewer during a multiplayer reality game on a wireless network 104. The operational flow diagram of FIG. 9 begins with step 902 and flows directly to step 904.

In step 904, a user of a wireless device on the wireless network 104, such as wireless device 106, specifies a target and attempts to initiate a voice call, such as a mobile telephone voice call or a push-to-talk call. The user is a participant or viewer, and the target of the call can be a viewer, a participant or the game sponsor (e.g., another wireless device or the wireless service provider 102). In step 906, the reality game framework component 402 of the wireless device 300 looks up the role of the initiator of the call and the rules associated with the initiator.

Figure 10:
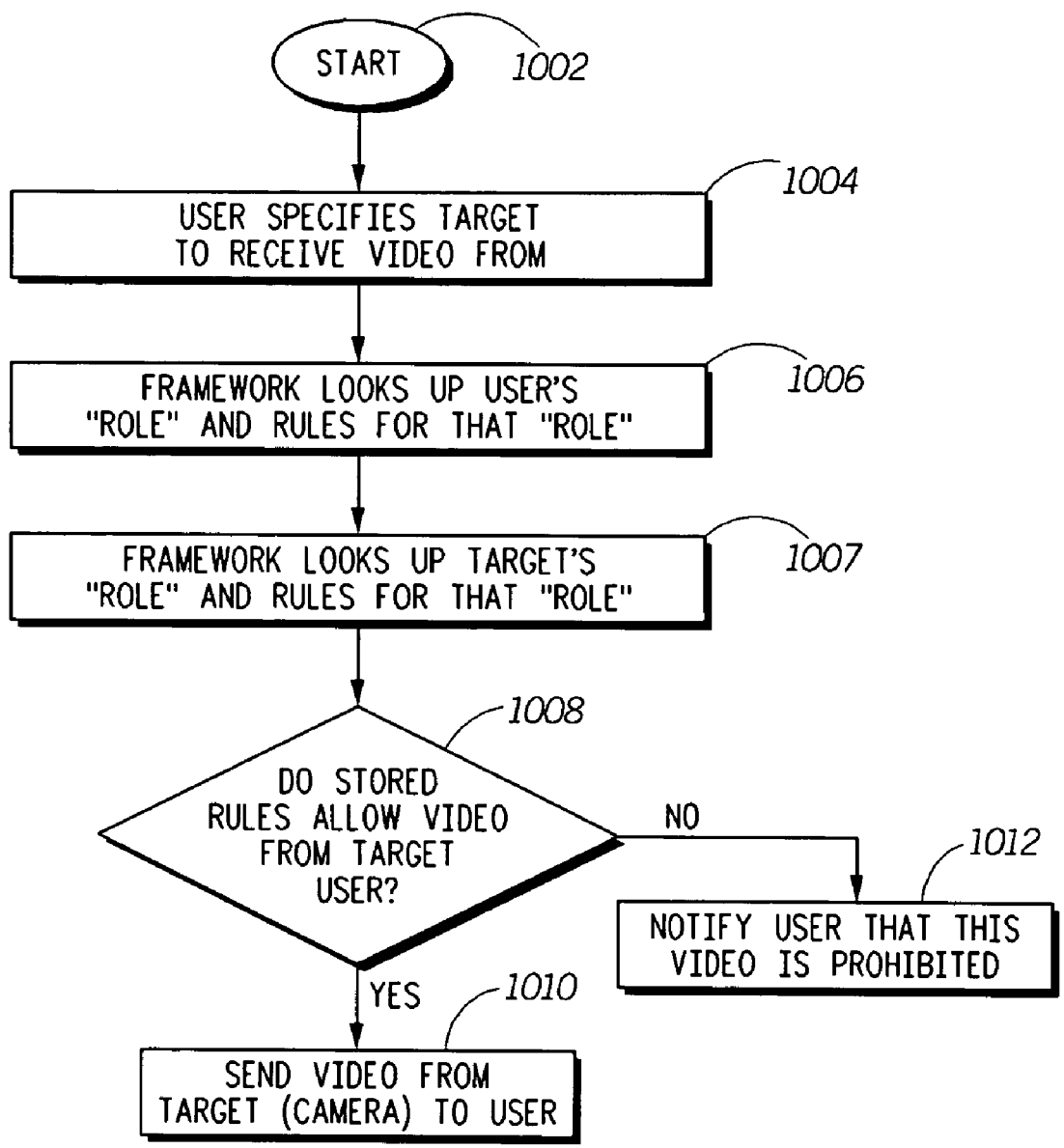
FIG. 10 is an operational flow diagram of image targeting logic on a wireless device according to an embodiment of the present invention.

In step 907, the reality game framework component 402 of the wireless device 300 looks up the role of the target of the call and the rules associated with the target. In step 908, the reality game framework component 402 of the wireless device 300 determines whether the call can be made to the target according to the rules. If the reality game framework component 402 of the wireless device 300 determines that the call can be made to the target according to the rules, then in step 910 the call to the target is connected in the usual manner. If the reality game framework component 402 of the wireless device 300 determines that the call cannot be made to the target according to the rules, then in step 912 the wireless device 300 notifies the user that the call is prohibited under the rules of the game. FIG. 10 is an operational flow diagram of image targeting logic on a wireless device according to an embodiment of the present invention. The operational flow diagram of FIG. 10 depicts the process for handling an image information request (e.g., still image or video) by a participant or viewer during a multiplayer reality game on a wireless network 104. The operational flow diagram of FIG. 10 begins with step 1002 and flows directly to step 1004.

In step 1004, a user of a wireless device on the wireless network 104, such as wireless device 106, requests image information, such as video, from a target. The user is a participant or viewer, and the target can be a viewer, a participant or the game sponsor (e.g., another wireless device or the wireless service provider 102). In step 1006, the reality game framework component 402 of the wireless device 300 looks up the role of the requester and the rules associated with the requester.

In step 1007, the reality game framework component 402 of the wireless device 300 looks up the role of the target and the rules associated with the target. In step 1008, the reality game framework component 402 of the wireless device 300 determines whether the requested video can be garnered from the target according to the rules. If the reality game framework component 402 of the wireless device 300 determines that the requested video can be garnered from the target according to the rules, then in step 1010 the wireless device 300 receives video from the target. If the reality game framework component 402 of the wireless device 300 determines that the requested video cannot be garnered from the target according to the rules, then in step 1012 the wireless device 300 notifies the user that the requested video is prohibited from being garnered from the target.

In the embodiment described above, the reality game framework component 402 of the wireless device of the sending user downloads the rules from the sponsor before the game, and then uses the logic flows of FIGS. 8-10 to enforce those rules during the game. In another embodiment that will now be explained with reference to FIGS. 11-13, the reality game framework component 502 of the wireless service provider 102 stores the rules (via upload from the sponsoring wireless device if the service provider is not the sponsor), and then uses the logic described below to enforce those rules (e.g., by selectively authorizing messages, calls, and images to be transmitted through its wireless network).

Figure 11:
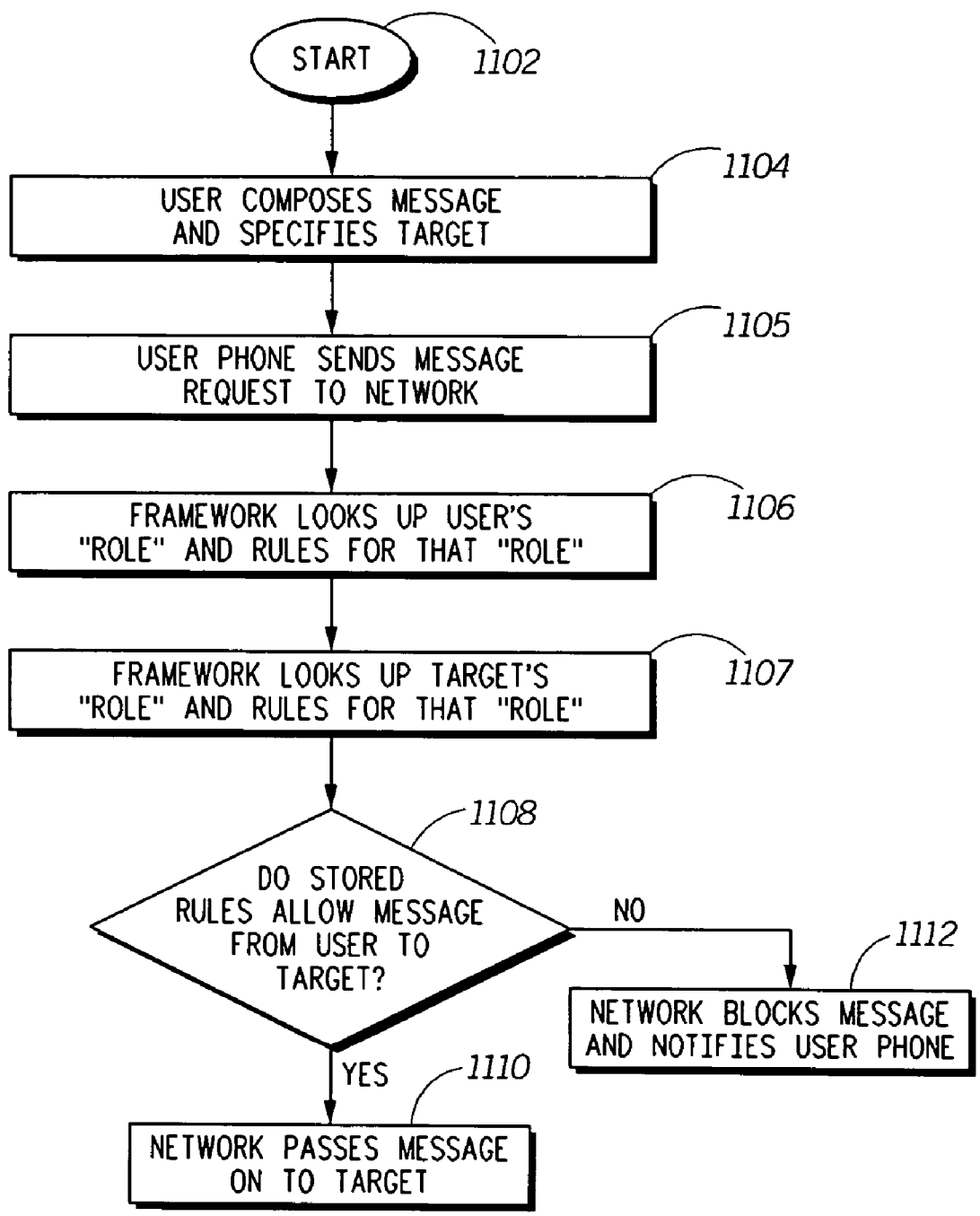
FIG. 11 is an operational flow diagram of message targeting logic of a wireless service provider according to an embodiment of the present invention.

FIG. 11 is an operational flow diagram of message targeting logic of a wireless service provider 102 according to an embodiment of the present invention. The operational flow diagram of FIG. 11 depicts the process for handling message exchanges during a multiplayer reality game on a wireless network 104. The operational flow diagram of FIG. 11 begins with step 1102 and flows directly to step 1104.

In step 1104, a user of a wireless device on the wireless network 104, such as wireless device 106, composes a message, such as a text message, and specifies a target of the message. The user is a participant or viewer, and the target of the message can be a viewer, a participant or the game sponsor (e.g., another wireless device or the wireless service provider 102). In step 1105, the wireless device 106 sends a message request to a server of the wireless service provider 102, indicating a desire to send the message to the target. In step 1106, the reality game framework component 502 of the server of the wireless service provider 102 looks up the role of the sender of the message and the rules associated with the sender.

In step 1107, the reality game framework component 502 looks up the role of the target of the message and the rules associated with the target. In step 1108, the reality game framework component 502 determines whether the message composed by the sender can be sent to the target according to the rules. If the reality game framework component 502 of the server of the wireless service provider 102 determines that the message composed by the sender can be sent to the target according to the rules, then in step 1110 the server sends the message to the target. If the reality game framework component 502 determines that the message composed by the sender cannot be sent to the target according to the rules, then in step 1112 the server notifies the user that the message is prohibited from being sent to the target.

Figure 12:
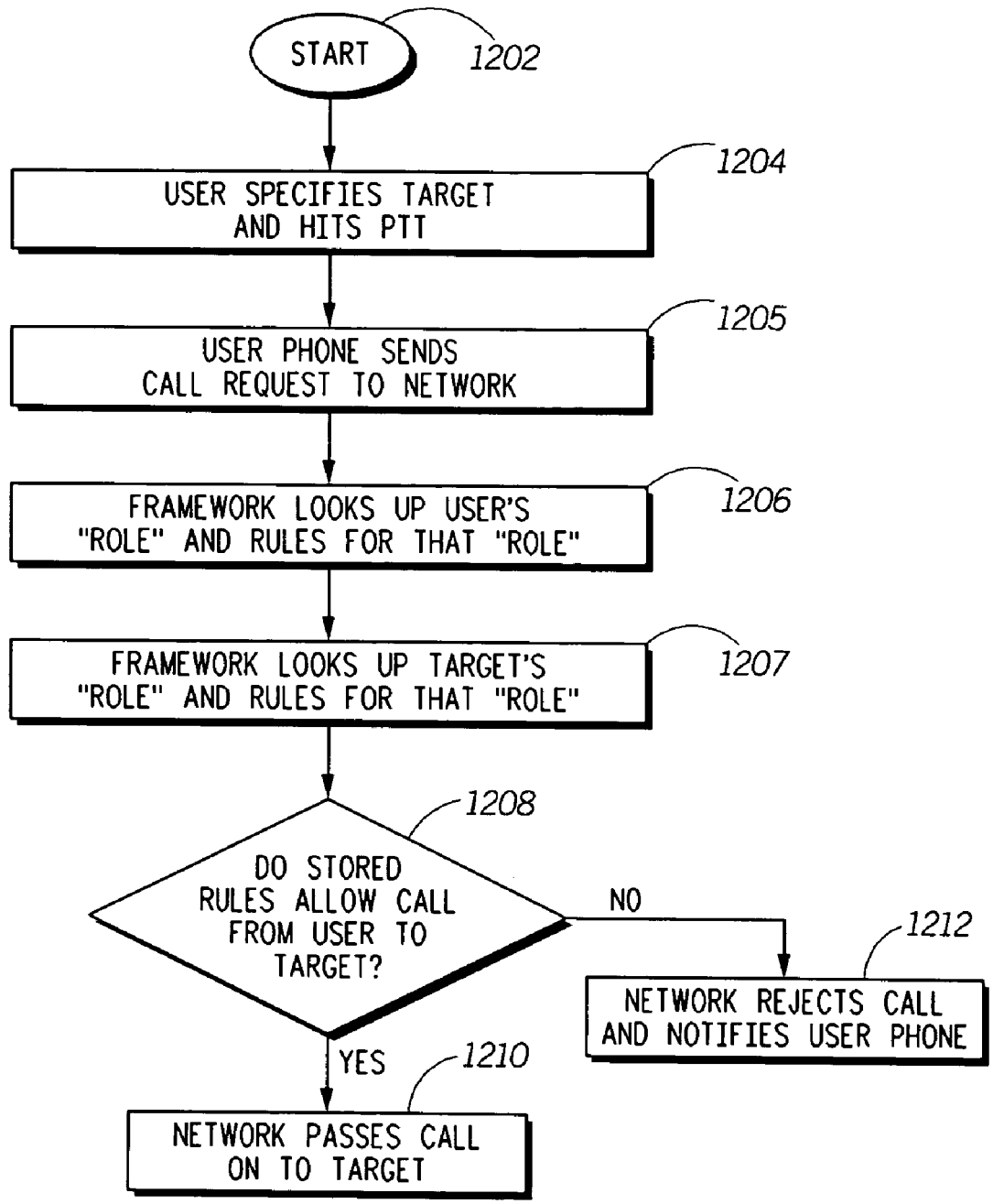
FIG. 12 is an operational flow diagram of voice targeting logic of a wireless service provider according to an embodiment of the present invention.

FIG. 12 is an operational flow diagram of voice targeting logic of a wireless service provider according to an embodiment of the present invention. The operational flow diagram of FIG. 12 depicts the process for handling voice calls during a multiplayer reality game on a wireless network 104. The operational flow diagram of FIG. 12 begins with step 1202 and flows directly to step 1204.

In step 1204, a user of a wireless device on the wireless network 104, such as wireless device 106, specifies a target and attempts to initiate a voice call, such as a mobile telephone voice call or a push-to-talk call. The user is a participant or viewer, and the target of the call can be a viewer, a participant or the game sponsor (e.g., another wireless device or the wireless service provider 102). In step 1205, the wireless device 106 sends a call request to a server of the wireless service provider 102, indicating a desire to make a call to the target. In step 1206, the reality game framework component 502 of the server of the wireless service provider 102 looks up the role of the initiator of the call and the rules associated with the initiator.

In step 1207, the reality game framework component 502 looks up the role of the target of the call and the rules associated with the target. In step 1208, the reality game framework component 502 determines whether the call can be made to the target according to the rules. If the reality game framework component 502 determines that the call can be made to the target according to the rules, then in step 1210 the server connects the call to the target. If the reality game framework component 502 determines that the call cannot be made to the target according to the rules, then in step 1212 the server notifies the user that the call is prohibited from being made to the target.

Figure 13:
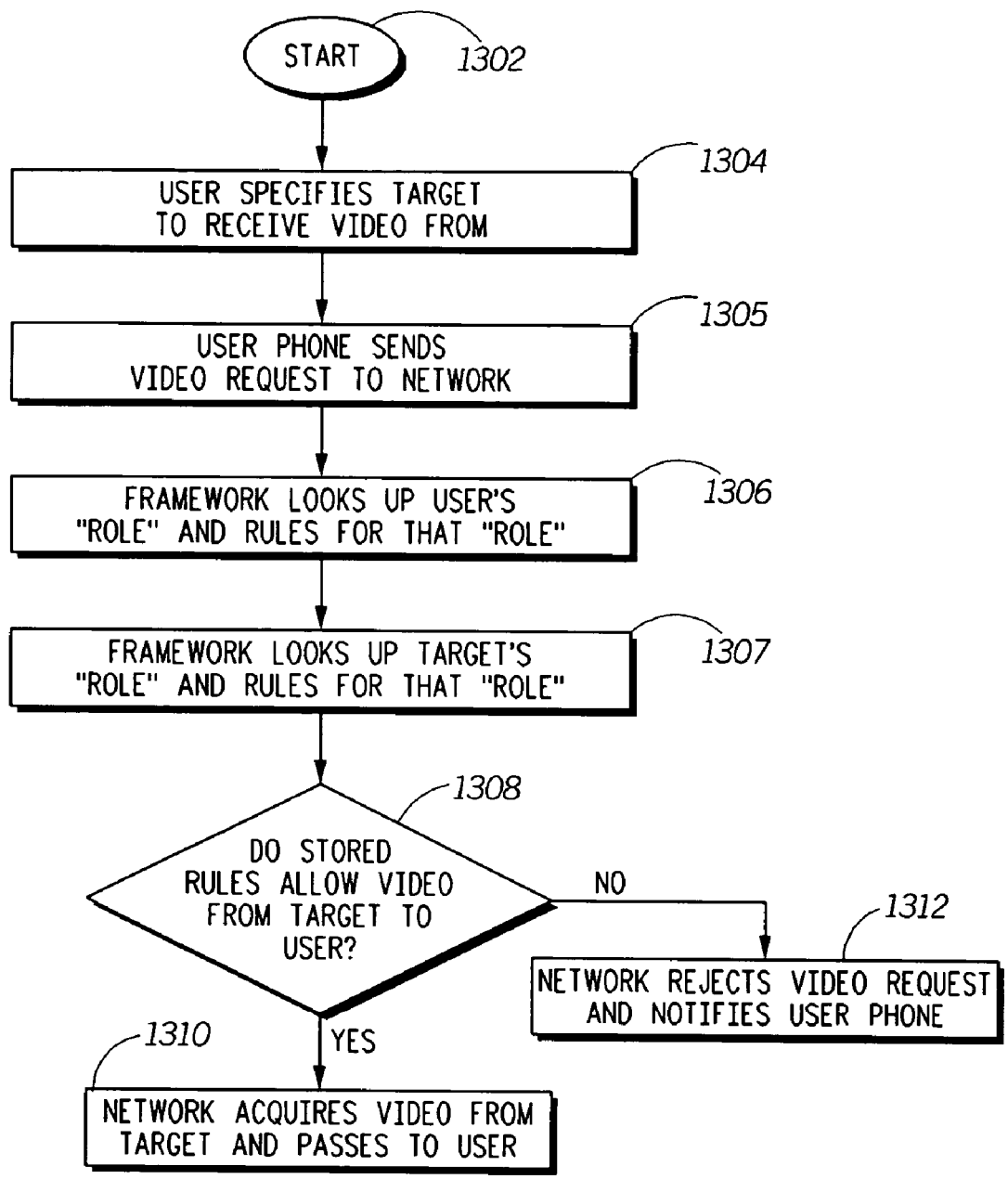
FIG. 13 is an operational flow diagram of image targeting logic of a wireless service provider according to an embodiment of the present invention.

FIG. 13 is an operational flow diagram of image targeting logic of a wireless service provider according to an embodiment of the present invention. The operational flow diagram of FIG. 13 depicts the process for handling image information requests (e.g., still image or video) during a multiplayer reality game on a wireless network 104. The operational flow diagram of FIG. 13 begins with step 1302 and flows directly to step 1304.

In step 1304, a user of a wireless device on the wireless network 104, such as wireless device 106, requests image information, such as video, from a target. The user is a participant or viewer, and the target can be a viewer, a participant or the game sponsor (e.g., another wireless device or the wireless service provider 102). In step 1305, the wireless device 106 sends a video request to a server of the wireless service provider 102, indicating a desire to receive video from the target. In step 1306, the reality game framework component 502 of the server of the wireless service provider 102 looks up the role of the requestor and the rules associated with the requester.

In step 1307, the reality game framework component 502 looks up the role of the target and the rules associated with the target. In step 1308, the reality game framework component 502 determines whether the requested video can be garnered from the target according to the rules. If the reality game framework component 502 determines that the requested video can be garnered from the target according to the rules, then in step 1310 the server acquires the requested video from the target and transmits it to the user. If the reality game framework component 502 determines that the requested video cannot be garnered from the target according to the rules, then in step 1312 the server notifies the user that the video is prohibited from being garnered from the target.

In yet another embodiment, the reality game framework component of the sponsor (e.g., a wireless device 106 or the wireless service provider 102) stores the rules and uses logic such as that described above to enforce those rules.

Exemplary Implementations

The present invention can be realized in hardware, software, or a combination of hardware and software. A system according to an embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose processor with a computer program that, when being loaded and executed, controls the processor such that it carries out the methods described herein.

The present invention can also be embedded in a computer program product, which comprises all the features enabling the implementation of the methods described herein, and which—when loaded in a system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer program product on a computer readable medium, allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for facilitating a multiplayer game using a plurality of wireless devices that are connected via a wireless network, the method comprising the steps of:
   receiving a request to transfer information between at least two of the wireless devices during the multiplayer game, the information being text, audio, or image information;
   determining whether the requested transfer is permitted according to a set of predefined rules for the multiplayer game; and
   transferring the information between the at least two wireless devices only if it is determined that the predefined rules permit the requested transfer;
   wherein the determining step includes the sub-steps of:
      determining whether a first of the at least two wireless devices is operated by a participant or a non-participating viewer;
      determining whether a second of the at least two wireless devices is operated by a participant or a non-participating viewer; and
      determining whether the requested transfer is permitted according to the predefined rules that apply to at least one of participants and non-participating viewers of the multiplayer game;
      wherein information unrelated to the name is distinguishable from game information.

2. The method of claim 1, wherein the at least two wireless devices are mobile telephones and the wireless network is a mobile telephone network.

3. The method of claim 1, wherein each of the at least two wireless devices is operated by a participant of the multiplayer game.

4. The method of claim 1,
   wherein at least some of the plurality of wireless devices are operated by participants that are divided into a plurality of teams, and
   in the determining step, the determination is based at least partially on whether the at least two wireless devices are operated by participants on the same team or participants on different teams.

5. The method of claim 1, further comprising the step of updating a date book or calendar of a participant or a non-participating viewer in accordance with a schedule of the multiplayer game.

6. The method of claim 1, further comprising the step of sponsoring the multiplayer game by providing the set of predefined rules.

7. The method of claim 1, further comprising the step of sending a notification to at least one of the at least two wireless devices, if it is determined that the predefined rules do not permit the requested transfer.

8. The method of claim 1, wherein the multiplayer game is a multiplayer reality game and the information is a live image or live video.

9. The method of claim 1, wherein the messaging unrelated to the game is distinguishable from game messages by alert tone, color, light pattern, inbox or icon.

10. A wireless device for use with a multiplayer game, the wireless device comprising:
   an input interface for receiving a request to transfer information with at least one other wireless device during the multiplayer game, the information being text, audio, or image information;
   a game framework component for determining whether the requested transfer is permitted according to a set of predefined rules for the multiplayer game; and
   a communication interface for transferring the information with the at least one other wireless device via a wireless network only if it is determined that the predefined rules permit the requested transfer;
   wherein the game framework component determines whether the wireless device is operated by a participant or a non-participating viewer, determines whether the at least one other wireless device is operated by a participant or a non-participating viewer, and determines whether the requested transfer is permitted according to the predefined rules that apply to at least one of participants and non-participating viewers of the multiplayer game;
   wherein information that is unrelated to the name is distinguishable from game information.

11. The wireless device of claim 10, wherein the wireless device is a mobile telephone and the wireless network is a mobile telephone network.

12. The wireless device of claim 10, further comprising storage for storing the set of predefined rules.

13. The wireless device of claim 10, wherein the game framework component receives the set of predefined rules from a sponsor of the multiplayer game.

14. The wireless device of claim 10, further comprising a rule interface for sponsoring the multiplayer game by providing the set of predefined rules to the other wireless device.

15. The wireless device of claim 10, wherein the multiplayer game is a multiplayer reality game and the information is a live image or live video.

16. The wireless device of claim 10, wherein the messaging unrelated to the game is distinguishable from game messages by alert tone, color, light pattern, inbox or icon.

17. A server for facilitating a multiplayer game over a wireless network, the server comprising:
   an input interface for receiving a request to transfer information between at least two wireless devices during the multiplayer game, the information being text, audio, or image information;

a game framework component for determining whether the requested transfer is permitted according to a set of predefined rules for the multiplayer game; and a communication interface for transferring the information between the at least two wireless devices via a wireless network only if it is determined that the predefined rules permit the requested transfer;

wherein the game framework component determines whether a first of the at least two wireless devices is operated by a participant or a non-participating viewer, determines whether a second of the at least two wireless devices is operated by a participant or a non-participating viewer, and determines whether the requested transfer is permitted according to the predefined rules that apply to at least one of participants and non-participating viewers of the multiplayer game;

wherein information that is transferred between the two wireless devices that is unrelated to the game is distinguishable from game information transferred between the two wireless devices.

18. The server of claim 17, wherein the game framework component receives the set of predefined rules from one of the at least two wireless devices.

19. The server of claim 17, wherein the multiplayer game is a multiplayer reality game and the information is a live image or live video.

20. The server of claim 17, wherein the game framework component determines whether the requested transfer is permitted based at least partially on whether the at least two wireless devices are operated by participants on the same team or participants on different teams.

21. The server of claim 17, wherein the game framework component determines the outcome of the game based at least partially on the predefined rules.

22. The server of claim 17, wherein the messaging unrelated to the game is distinguishable from game messages by alert tone, color, light pattern, inbox or icon.

* * * * *